United States Patent
Fernández Durán et al.

(10) Patent No.: US 6,285,859 B1
(45) Date of Patent: Sep. 4, 2001

(54) METHOD FOR PREDISTORTION OF A SIGNAL TRANSMITTED BETWEEN TWO UNITS OF A TELECOMMUNICATIONS NETWORK AND A UNIT FOR CARRYING OUT THE METHOD

(75) Inventors: Alfonso Fernández Durán, Madrid; Gregorio Núñez León De Santos, Toledo, both of (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/245,332

(22) Filed: Feb. 5, 1999

(30) Foreign Application Priority Data

Feb. 16, 1998 (EP) .................................................. 98500045

(51) Int. Cl.$^7$ ....................................................... H04Q 7/20
(52) U.S. Cl. ......................... 455/63; 455/278.1; 375/296
(58) Field of Search ............................... 455/63, 67.3, 69, 455/103, 278.1, 570, 295, 296, 127, 420, 501, 68, 517; 375/285, 296, 221, 222, 231, 278, 233, 284, 232

(56) References Cited

U.S. PATENT DOCUMENTS

| | | | |
|---|---|---|---|
| 3,593,142 | * 7/1971 | Freeny et al. | 375/230 |
| 4,995,057 | * 2/1991 | Chung | 375/231 |
| 5,113,414 | * 5/1992 | Karam et al. | 375/296 |
| 5,251,328 | * 10/1993 | Shaw | 455/73 |
| 5,448,206 | * 9/1995 | Newhall | 332/103 |
| 5,577,026 | * 11/1996 | Gordon et al. | 370/278 |
| 5,636,244 | * 6/1997 | Goodson et al. | 375/231 |
| 5,793,759 | * 8/1998 | Rakib et al. | 370/342 |
| 5,796,814 | * 8/1998 | Brajal et al. | 375/232 |
| 5,881,108 | * 3/1999 | Herzberg et al. | 375/296 |
| 6,097,441 | * 8/2000 | Allport | 348/552 |
| 6,134,265 | * 10/2000 | Long | 375/222 |

* cited by examiner

Primary Examiner—Nay Maung
Assistant Examiner—Jean A Gelin
(74) Attorney, Agent, or Firm—Sughrue, Mion, Zinn, Macpeak & Seas, PLLC

(57) ABSTRACT

A method for predistorting a signal sent from a first unit (U1) to a second unit, the first unit (U1) sending data to the second unit (U2) through a first channel and the second unit (U2) sending data to the first unit (U1) through a second channel. The method comprises the computing (53) of representative coefficients of the second channel (H2) on the basis of a second predetermined sequence sent (52) from the second unit (U2) to the first unit (U1). According to the method, the first unit (U1) sends a first predetermined sequence to the second unit (U2) which sends it back in the form received to the first unit (U1), in the form of a return sequence. The first unit (U1) computes representative coefficients of the first and second channels jointly (H1, H2) on the basis of the returned sequence received. The signal sent by the first unit is predistorted according to the representative coefficients of the channel and the said representative coefficients of the first and second channels jointly.

11 Claims, 4 Drawing Sheets

METHOD FOR PREDISTORTION OF A SIGNAL TRANSMITTED BETWEEN TWO UNITS OF A TELECOMMUNICATIONS NETWORK AND A UNIT FOR CARRYING OUT THE METHOD

OBJECT OF THE INVENTION

The present invention refers to a method for predistortion of a signal transmitted or sent from a first unit to a second unit of a telecommunications system, as well as a unit for carrying out the method. For example, the two units exchange data or voice signals through a radio channel, an optical fibre, a copper wire, or any other type of physical medium.

STATE OF THE ART

Typically, a unit in accordance with the present invention equalizes the received signal and predistorts the transmitted signal. The unit comprises an equalizer in the reception chain and a predistorter in the transmission chain. The object of incorporating the equalization and predistortion functions in the same unit is to reduce the cost of the other remote unit/s exchanging data with the said unit; these remote units do not need equalizers.

A unit of this type, including an equalizer and a predistorter, is known from the document "Adaptive channel precoding for personal communications" by W. ZHUANG et al., published in the magazine "Electronics Letters" on Sep. 15, 1994, Vol. 30, No. 19, pages 1570–1571. In accordance with this document, over a period of time, the same equalization coefficients computed in reception are used to predistort the signal transmitted. This solution results from the hypothesis that the interferences or distortions that are applied to the sent or transmitted signal are the same as the interferences that are applied to the signal received, that is, that the characteristics of the transmission and reception channels are the same.

This hypothesis is false if the respective transmission and reception channels are different, for example (a)—through being defined by respective frequencies that are different among themselves, as is the case in Frequency Duplex Division (FDD), or—(b)—through being defined by physical media that are different among themselves, etc . . .

CHARACTERIZATION OF THE INVENTION

One object of the present invention is to define methods of predistorting a signal transmitted from a first unit to a second unit in a telecommunications system, taking into account the difference in characteristics between the respective transmission and reception channels. Accordingly, a method of predistorting a signal sent from a first unit to a second unit, the first unit sending data to the second unit through a first channel and the second unit sending data to the first unit through a second channel, the method comprising the following step:

in the first unit, the computing of representative coefficients of the second channel on the basis of a second predetermined sequence sent from the second unit to the first unit; is characterized in that it comprises the following steps:
the sending by the first unit of a first predetermined sequence to the second unit which sends it back in the form received to the first unit, in the form of a return sequence;
in the said first unit, the computing of representative coefficients of the first and second channels jointly, on the basis of the return sequence received; and
predistortion of the signal sent by the first unit by means of inverse coefficients of the first channel which are computed according to the said representative coefficients of the second channel and the said representative coefficients of the first and second channels jointly.

According to a first sub-alternative, the representative coefficients of the second channel are inverse coefficients of the second channel, and the representative coefficients of the first and second channels jointly are direct coefficients of the first and second channels jointly, predistortion being carried out with the inverse coefficients of the convolution of both the inverse coefficients of the second channel and the direct coefficients of the first and second channels jointly.

According to another sub-alternative, the representative coefficients of the second channel are direct coefficients of the second channel and the representative coefficients of the first and second channels jointly are inverse coefficients of the first and second channels jointly, predistortion being carried out by means of he coefficients of the convolution of the direct coefficients of the second channel and of the inverse coefficients of the first and second channels.

Another object of the present invention is to define units for predistorting a signal to be transmitted in accordance with the methods defined above. Accordingly, a unit for carrying out this method comprises:

means to predistort the signal to be sent; and it is characterized in that it comprises:
means to compute representative coefficients of the second channel on the basis of a second predetermined sequence sent from the remote unit to the unit;
means to send a first predetermined sequence to the remote unit, which sends it back in the form received to the said unit, in the form of a return sequence;
means to compute representative coefficients of the first and second channels jointly, on the basis of the return sequence received; and in that
the predistorting means predistort the signal sent by the inverse coefficients of the first channel which are computed according to the said representative coefficients of the second channel and the said representative coefficients of the first and second channels jointly.

In accordance with the present invention, another method to predistort a signal sent from a first unit to a second unit, the first unit sending data to the said second unit through a first channel and the second unit sending data to the first unit through a second channel, the method comprising the following step:

in the first unit, the computing of representative coefficients of the second channel on the basis of a second predetermined sequence sent from the second unit to the first unit; and it is characterized in that it comprises the following steps:
the sending by the first unit to the second unit of a first sequence which results from the convolution of a predetermined sequence and of the said representative coefficients of the second channel, the first sequence being sent back in the form it was received by the second unit to the first unit in the form of a return sequence;
in the said first unit, the computing of inverse coefficients of the first channel on the basis of the said return sequence; and
predistortion of the signal sent by the first unit on the basis of the said inverse coefficients of the first channel.

BRIEF EXPLANATION OF THE DRAWINGS

A more detailed explanation showing other characteristics and advantages of the present invention is given in the following specification based on the attached drawings, in which.

DESCRIPTION OF THE INVENTION

Figure 1:
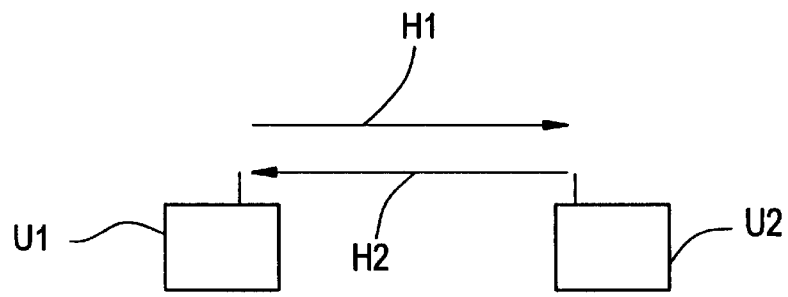
FIG. 1 shows two units exchanging data through two respective channels which are different from each other.

FIG. 1 shows two units, U1 and U2, of a telecommunications system exchanging data through two channels, H1 and H2, respectively. For example, the channels are two physical channels or two radio channels that are distinct from each other, that is defined by different characteristics. As an example, the invention is described in the present application within the framework of a radiocommunications system, although the said invention may be adapted to all types of applications in which two units send data through two different channels respectively. The two radio channels, H1 and H2, are defined by two frequencies that are different from each other.

Figure 2:
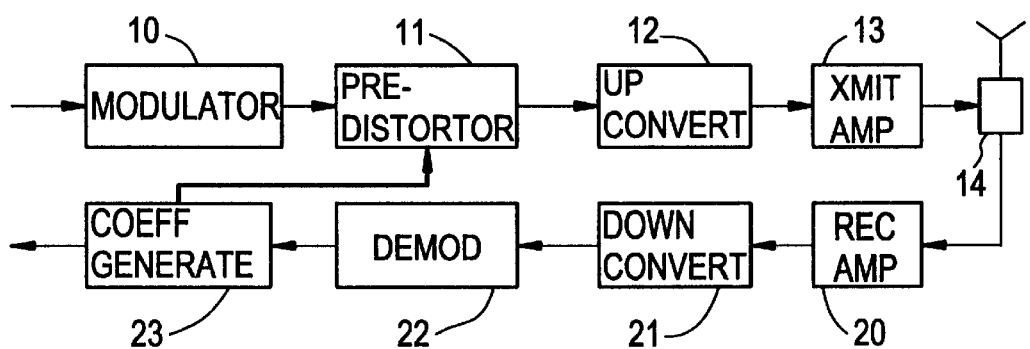
FIG. 2 shows a block diagram of a first unit of FIG. 1.

With respect to FIG. 2, the first unit U1 comprises, in the transmission chain, a modulator 10, a predistorter 11, an up-converter 12, a transmitting amplifier 13 and a duplexor 14. In the reception chain, the said first unit U1 comprises the duplexor 14, a reception amplifier 20, a down-converter 21, a demodulator 22 and a generator of predistortion coefficients 23.

Figure 4:
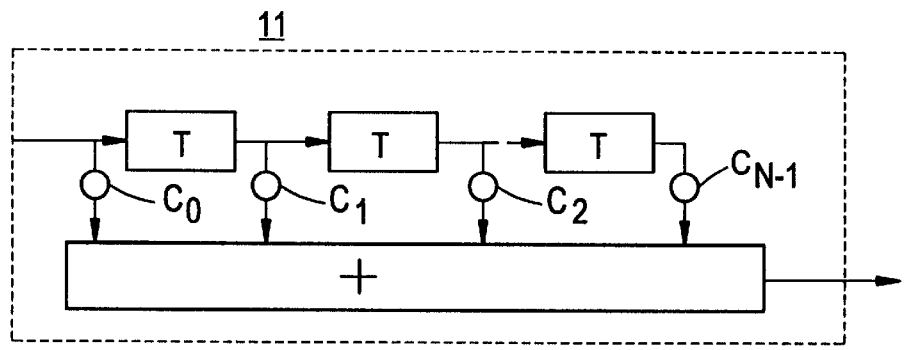
FIG. 4 is a block diagram of a predistorter included in the first unit of FIG. 2.

FIG. 4 shows a predistorter 11 of length N in accordance with an embodiment of the present invention. This predistorter has the structure of a conventional lineal equalizer, but all other types of predistorter may be used in accordance with the invention. This predistorter 11 carries out a function of "equalization" of the transmitted signal instead of carrying out an equalization of the signal received in the remote unit. The predistorter 11 comprises taps separated by time intervals, T/2. The signal x(n) produced by the modulator 10 is applied to an input of the predistorter which delays the same through delay lines, T/2, connected in cascade. The output of the first delay line is x(n−1), the output of the second delay line is x(n−2), the output of the third delay line is x(n−3), and so on repeatedly in such a way that the output of the last delay line is x(n−N+1). There is a total of (N−1) delay lines and N predistortion coefficients. The N predistortion coefficients c0, c1, c2, . . . cN−1 are complex numbers. Multipliers multiply the signal x(n) and the different delayed signals x(n−1), x(n−2), x(n−3), . . . , x(n−N+1) by the predistortion coefficients c0, c1, c2, . . . , cN−1, respectively. An adder adds the resulting multiplied signals to produce the predistorted signal which is applied to an input of the up-converter 12. In practice, the predistortion coefficients c0, c1, c2, . . . , cN−1 change periodically in accordance with the algorithms of FIGS. 6 and 7 in order to adapt to the characteristics of the channel H1.

Figure 5:
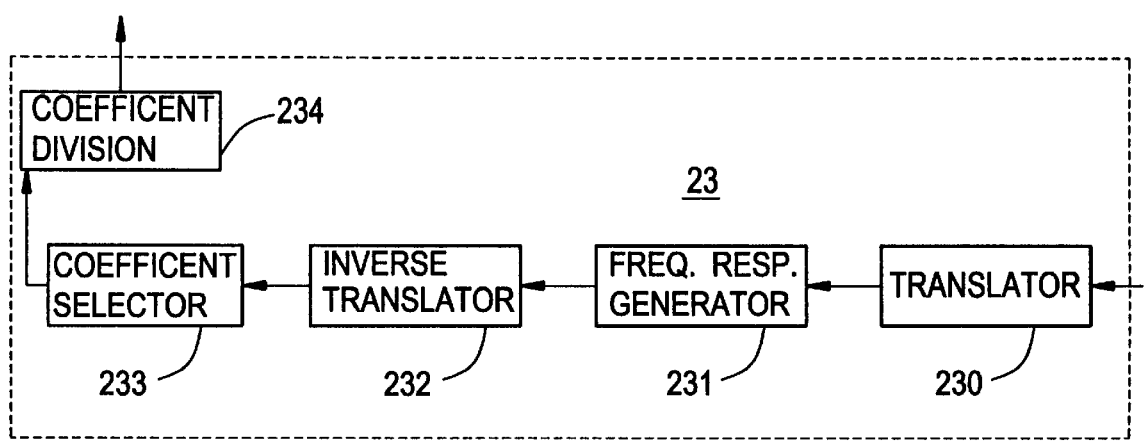
FIG. 5 is a block diagram of a generator of predistortion coefficients included in the first unit of FIG. 2.

The generator of predistortion coefficients 23 shown in FIG. 5 comprises a translator 230, a frequency response generator 231, an inverse translator 232, a division circuit of predistortion coefficients 234 and, alternatively, a coefficient selector 233. The output of the division circuit of predistortion coefficients 234 supplies the predistorter 11 with the appropriate predistortion coefficients c0, c1, c2, . . . , cN−1. The generator of predistortion coefficients 23 may use a processor, a microprocessor or another signal treatment device.

A training signal, or sequence, received from the output of the demodulator 22 and sampled by a sampler (not shown) is applied to an input of the generator of predistortion coefficients 23. The sampled signal is received by the translator 230 which converts the temporal signal received into a equivalent signal in the frequency domain. For example, a DFT circuit (Discrete Fourier Transform) is used to provide the function of the translator 230. The resulting signal is applied to an input of the frequency response generator, or channel invertor, 231 which applies the next existing lineal relations in order to generate inverse coefficients: a received training signal, divided by a training signal as it really is, represents the channel transfer function, and the inverse of this transfer function corresponds to the division of the training signal as it really is and the received training signal.

In the present description, the terms "inverse coefficients" refer to coefficients which, in the temporal domain, when convoluted with the direct coefficients (that is, the coefficients that define the channel) give the Dirac impulse as a result, and, in the frequency domain, when multiplied with the direct coefficients, give the Fourier Transform of this impulse as a result. In other words, these inverse coefficients are the coefficients of the inverse channel.

The training signal received by the unit U1 is normally different from the training signal initially transmitted, and corresponds to a distorted version of the said transmitted signal. The training signal as it is really is stored locally in the frequency response generator 231.

The inverse translator 232 generates a temporal pulse response sequence {y(0), y(1), y(2), . . . , y(M−1)} of the inverse channel. This temporal pulse response represents the inverse temporal characteristics of a channel, and defines a characteristic of finite pulse response of the said channel. In theory, if the finite pulse response sequence and the channel are in cascade, the overall pulse frequency response is equivalent to a bandpass filter with a pass band equal to the pass band of the channel.

The pulse response sequence {y(0), y(1), y(2), . . . , y(M−1)} defines predistortion coefficients used by the division module of predistortion coefficients 234 to supply the coefficients of the predistorter of FIG. 4, as described below with respect to FIGS. 6 and 7. In this case, M is equal to N.

Alternatively, the predistorter 11 may use less coefficients (N coefficients) than the number M of coefficients {y(0), y(1), y(2), . . . , y(M−1)} produced by the inverse translator 232. Accordingly, the selector 233 selects, for example, the coefficients associated with maximum energy of the received signal. These selected coefficients are applied to the division module of predistortion coefficients 234 to define the predistortion coefficients of the signal to be transmitted by the unit U1. An embodiment of a generator of predistortion coefficients 23 is described in U.S. Pat. No. 5,636,244, starting from column 5, line 14, which, being referred to in the present application, is included in it.

Figure 6:
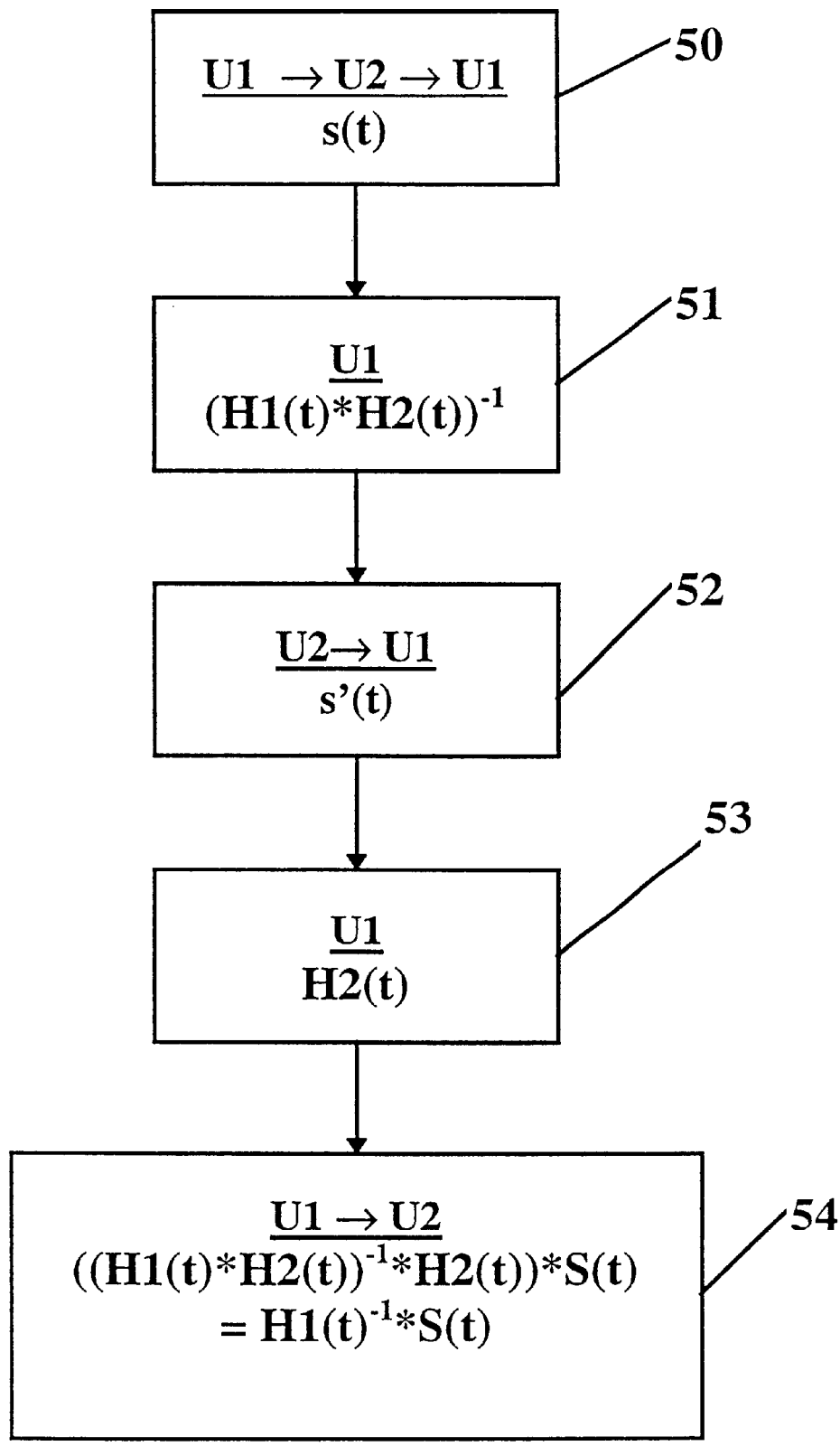
FIG. 6 shows a predistortion algorithm of a signal transmitted by the first unit according to a first embodiment of the invention.

With respect to FIG. 6, an algorithm is now described or carrying out a method in accordance with a first alternative solution of the present invention. This algorithm is implemented partly in the coefficient division circuit 234 of the first unit U1 and partly in the second unit, or remote unit, U2.

Figure 3:
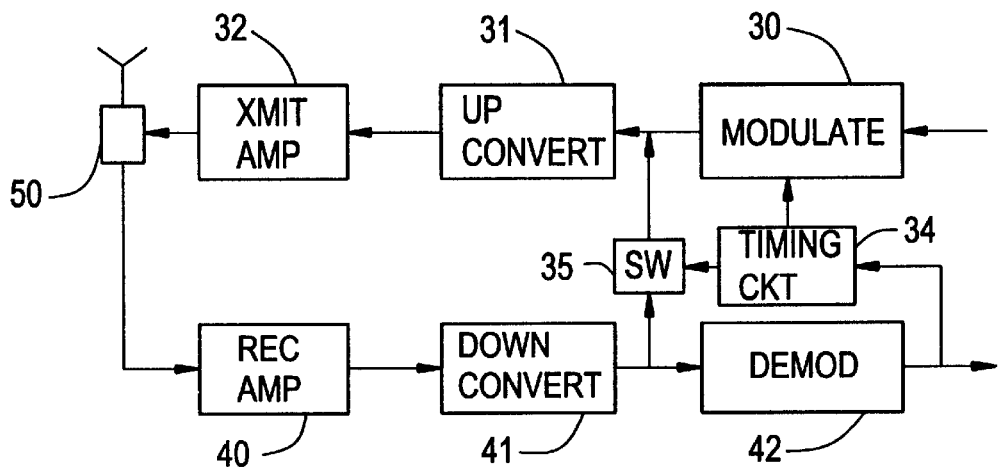
FIG. 3 shows a block diagram of a second unit of FIG. 1.

FIG. 6 shows a first embodiment of the present Convention. In accordance with STEP 50, the first unit U1 sends a first predetermined sequence, or training sequence, s(t) to the second unit U2 which sends it back in the form. received to the first unit U1, in the form of a return sequence. With respect to FIG. 3, the second unit U2 comprises, in the transmission chain, a modulator 30, an up-converter 31, a transmitting amplifier 32 and a duplexor 50. In the reception chain, this second unit U2 comprises the duplexor 50, a reception amplifier 40, a down-converter 41, and a demodulator 42. Also, the second unit U2 comprises a timing circuit 34 whose input is connected to an output of the demodulator 42 as well as a switch 35 controlled by the timing circuit 34. The switch 35 is connected between an output of the down-converter 41 and an input of the up-converter 32. So that the second unit U2 may send back the sequence s(t) received in the form received to the first unit U1, the timing circuit 34 detects the temporal location of the said sequence s(t) and controls the switch 35 in such a way that, during the time the said sequence appears, the output of the down-converter 41 connects to an input of the up-converter 32. At the same time, the timing circuit 34 blocks the output of the modulator 30. This has the result that the sequence s(t) sent by the first unit U1 is sent back in the form received by the second unit U2 to the first unit U1.

The first unit U1 receives the return signal $H1*H2*s(t)$, H1 being the transfer function of the associated channel H1, and H2 being the transfer function of the associated channel H2. In order to simplify the reference signs in the Present specification, the terms Hi and H2 are used to designate channels, transfer functions or coefficients associated with these functions. In accordance with STEP 51, the first unit U1 computes representative coefficients of the first and second channels jointly on the basis of the return signal received.

In accordance with STEP 53, the first unit U1 also computes representative coefficients of the second channel H2 on the basis of a second predetermined sequence, or training sequence, s'(t) (which may be the same as the sequence s(t)) sent (STEP 52) from the second unit U2 to the first unit U1. In accordance with STEP 54, according to these representative coefficients of the second channel H2 and of the representative coefficients of the first and second channels H1 and H2, the first unit U1 predistorts the signal sent to the second unit U2 with inverse coefficients $H1^{-1}$ of the first channel.

In accordance with a first sub-alternative of this first embodiment, the representative coefficients of the second channel are inverse coefficients $H2^{-1}$ of the second channel and the representative coefficients of the first and second channels jointly are direct coefficients $H1*H2$ of the first and second channels jointly. In this case, predistortion of the signal S(t) sent by U1 is carried out with the inverse coefficients $H1^{-1}$ of the convolution of the inverse coefficients of the second channel $H2^{-1}$ and the direct coefficients of the first and second channels $H1*H2$. The generator of predistortion coefficients 23 produces inverse coefficients according to the signal received and a predetermined (training) sequence stored locally. In order to produce direct coefficients from the inverse coefficients received from the generator 23, the coefficient division circuit 234 includes a coefficient inversion circuit of a type known in the state of the art.

In accordance with a second sub-alternative of the first embodiment illustrated in detail in FIG. 6, the representative coefficients of the second channel H2 are direct coefficients of the second channel and the representative coefficients of the first and second channels jointly are inverse coefficients $(H1*H2)^{-1}$ of the first and second channels jointly. In this case, predistortion is carried out with the coefficients $H1^{-1}$ of the convolution of the direct coefficients of the second channel and the inverse coefficients of the first and second channels jointly. As indicated above, the generator of predistortion coefficients 23 produces inverse coefficients according to the signal received and a predetermined sequence stored locally. in order to produce direct coefficients from the inverse coefficients received from the generator 23, the coefficient division circuit 234 includes a coefficient inversion circuit of a type known in the state of the art.

For this first embodiment, in the first unit U1, the circuitry 23 computes the representative coefficients of the second channel H2 or $H2^{-1}$ on the basis of the predetermined sequence s'(t) sent from the remote unit U2. The transmission chain of the first unit U1 sends the first predetermined sequence s(t) to the remote unit U2 which sends it back in the form received to the unit U1, as described with respect to FIG. 3. The circuitry 23 adjusts the representative coefficients $H1*H2$ or $(H1*H2)^{-1}$ of the first and second channels jointly on the basis of the return sequence received. The predistorter 11 predistorts the sent signal S(t) with the inverse coefficients $H1^{-1}$ of the first channel which are computed according to the representative coefficients of the second channel and the representative coefficients of the first and second channels jointly.

In the first sub-alternative, the circuitry computes the inverse coefficients $H2^{-1}$ of the second channel and computes the direct coefficients $H1*H2$ of the first and second channels jointly. In this case, the predistorter 11 predistorts the signal to be sent by means of the inverse coefficients $H1^{-1}$ of the convolution of the inverse coefficients of the second channel $H2^{-1}$ and of the direct coefficients of the first and second channels $H1*H2$. These inverse coefficients $H1^{-1}$ of the convolution of the inverse coefficients of the second channel $H2^{-1}$ and of the direct coefficients of the first and second channels $H1*H2$ are computed in the coefficient division circuit 234.

In the second sub-alternative, the circuitry 23 computes the direct coefficients H2 of the second channel and computes the inverse coefficients $(H1*H2)^{-1}$ of the first and second channels jointly. In this case, the predistorter 11 predistorts the signal to be sent by means of the coefficients $H1^{-1}$ of the convolution of the direct coefficients of the second channel and of the direct coefficients of the first and second channels.

Figure 7:
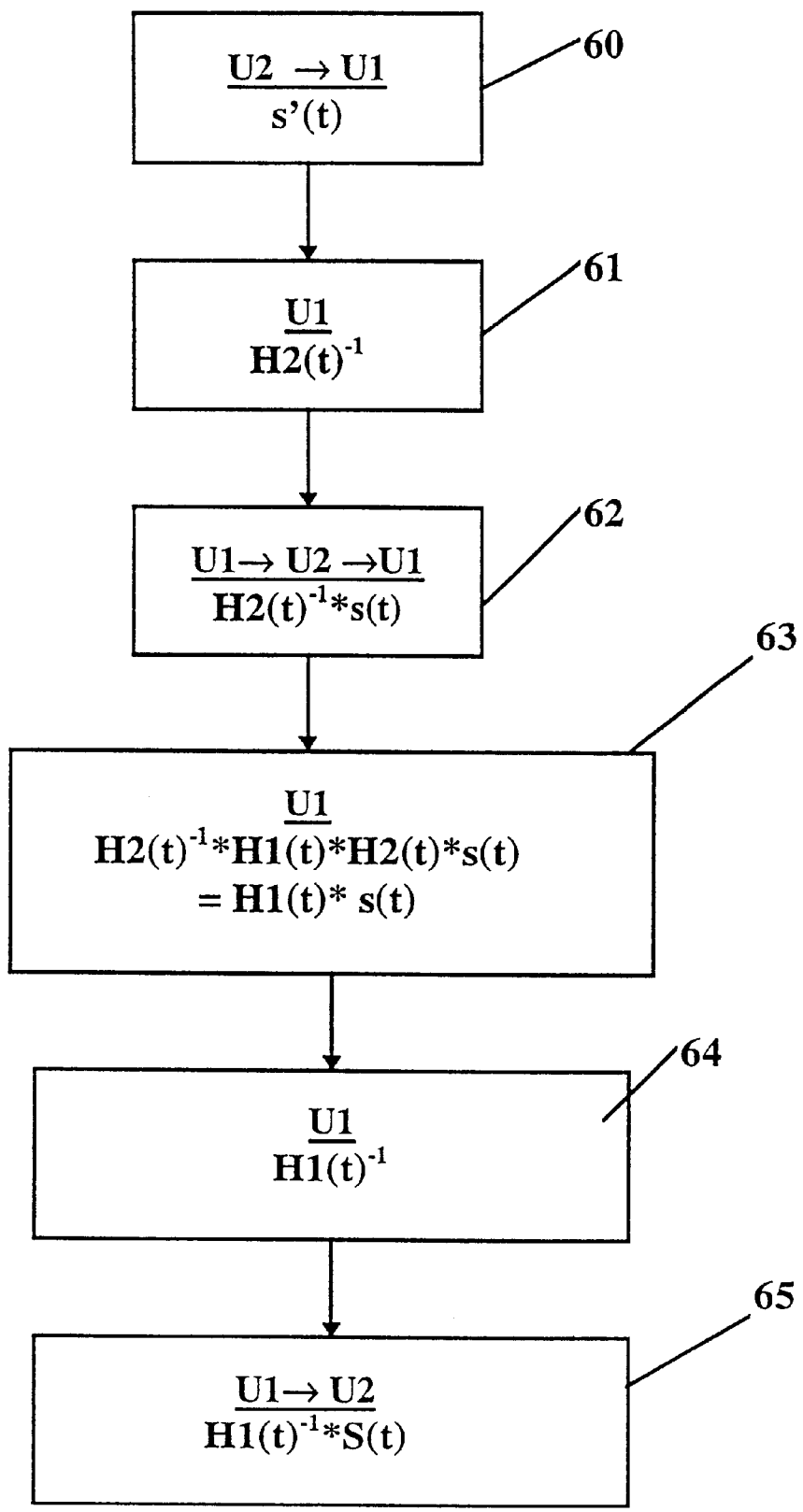
FIG. 7 shows a predistortion algorithm of a signal transmitted by the first unit according to a second embodiment of the invention.

FIG. 7 shows a second embodiment of the present invention.

In accordance with this second embodiment, the first unit U1 computes representative coefficients $H2^{-1}$ of the second channel (STEP 61) on the basis of a second sequence, typically a training sequence, s'(t) sent from the second unit U2 (STEP 60).

Also, the first unit U1 sends to the second unit U2 (STEP 62) a first sequence $H2^{-1}*s(t)$ which results from the convolution of a predetermined sequence s(t) and of the said representative coefficients $H2^{-1}$ of the second channel, the said first sequence being sent back as received by the second unit U2 to the first unit U1 in the form of a return sequence. The first unit U1 receives the signal $H2^{-1}*s(t)*H1*H2$ $=H1*s(t)$. The first unit U1 computes representative coefficients of the first channel $H1^{-1}$ on the basis of the return sequence, and predistorts the signal sent to the second unit U2 according to these representative coefficients of the first channel. The representative coefficients of the second channel are inverse coefficients $H2^{-1}$ of the second channel and the representative coefficients $H1^{-1}$ of the first channel are inverse coefficients of the convolution of the said return sequence $H2^{-1}*H2*H1*s(t)$ received by the first unit U1 and of an inverse predetermined sequence $s^{-1}(t)$.

In accordance with this second embodiment, in the unit U1, the circuitry 23 computes the inverse coefficients $H2^{-1}$ of the second channel on the basis of the second sequence s'(t) sent from the second unit U2 to the first unit U1. The transmission chain of this first unit U1 sends to the second unit U2 a first sequence $H2^{-1}*s(t)$ which results from the convolution of a predetermined sequence s(t) and of the inverse coefficients $H2^{-1}$ of the second channel, the said convoluted first sequence being sent back as received by the second unit U2 to the first unit U1 in the form of a return sequence $H2^{-1}*H1*H2*s(t)$. The circuitry 23 computes the inverse coefficients of the first channel $H1^{-1}$ on the basis of this return sequence.

In practice, the predistortion coefficients are periodically brought up to date by means of the algorithms of FIGS. 6 and 7 which are repeated over and over again.

Moreover, although the terms "predetermined sequence" or "training sequence" are used in the present specification, these terms cover any signal that allows the inverse coefficients $H1^{-1}$ of the first channel to be determined, using, for example, the process of blind equalization to determine the characteristic coefficients of the channels H1, H1*H2, etc . . .

What is claimed is:

1. A method for predistorting a signal sent from a first unit to a second unit, said first unit sending data to said second unit through a first channel and said second unit sending data to said first unit through a second channel, said method comprising the step of, in the first unit, computing representative coefficients of the second channel on the basis of a second predetermined sequence sent from the second unit to the first unit, characterized in that said method further comprises the following steps:

sending by the first unit of a first predetermined sequence to the second unit which sends it back in the form received to the first unit, in the form of a return sequence;

in the said first unit, computing representative coefficients of the first and second channels jointly, on the basis of the return sequence received; and predistorting the signal sent by the first unit by means of inverse coefficients of the first channel which are computed according to said representative coefficients of the second channel and said representative coefficients of the first and second channels jointly.

2. A method according to claim 1, characterized in that said representative coefficients of the second channel are inverse coefficients of the second channel, and said representative coefficients of the first and second channels jointly are direct coefficients of the first and second channels jointly, said predistortion being carried out with the inverse coefficients of the convolution of both the inverse coefficients of the second channel and the direct coefficients of the first and second channels jointly.

3. A method according to claim 1, characterized in that said representative coefficients of the second channel are direct coefficients of the second channel and said representative coefficients of the first and second channels jointly are inverse coefficients of the first and second channels jointly, said predistortion being carried out by means of the coefficients of the convolution of the direct coefficients of the second channel and of the inverse coefficients of the first and second channels.

4. A method for predistorting a signal sent from a first unit to a second unit, said first unit sending data to said second unit through a first channel and said second unit sending data to said first unit through a second channel, said method comprising the step of, in the first unit, computing representative coefficients of the second channel on the basis of a second predetermined sequence sent from the second unit to the first unit, characterized in that said method further comprises the following steps:

sending by the first unit to the second unit a first sequence which results from the convolution of a predetermined sequence and of said representative coefficients of the second channel, said first sequence being sent back as received by second unit to the first unit, in the form of a return sequence;

in said first unit, computing inverse coefficients of the first channel on the basis of said return sequence; and predistorting the signal sent by the first unit on the basis of said inverse coefficients of the first channel.

5. A method according to claim 4, characterized in that said representative coefficients of the second channel are inverse coefficients of the second channel, and said representative coefficients of the first channel are inverse coefficients of the convolution of said return sequence received by the first unit and of an inverse predetermined sequence.

6. A unit of a telecommunications system that predistorts a signal to be sent to a remote unit, said unit comprising a predistorter which predistorts said signal to be sent, said unit characterized in that it comprises:

a first coefficient computer which computes representative coefficients of the second channel on the basis of a second predetermined sequence sent from the remote unit to the unit;

a first sequence transmitter which transmits a first predetermined sequence to the remote unit, which sends it back in the form received to the said unit, in the form of a return sequence;

a second coefficient computer which computes representative coefficients of the first and second channels jointly, on the basis of the return sequence received; and wherein said predistorter predistorts the signal sent by means of the inverse coefficients of the first channel which are computed according to said representative coefficients of the second channel and said representative coefficients of the first and second channels jointly.

7. A remote unit for sending back to the unit according to claim 6, in the form as received, said first predetermined sequence in the form of a return sequence, characterized in that said remote unit comprises:

a connector which connects, in a way that is synchronized with the arrival of the predetermined sequence, an output of a down-converter with an input of an up-converter.

8. A unit according to claim 6, characterized in that the computing first coefficient computer computes inverse coefficients of the second channel, second coefficient computer computes direct coefficients of the first and second channels jointly, and the predistorter predistorts the signal to be sent by means of the inverse coefficients of the convolution of inverse coefficients of the second channel and direct coefficients of the first and second channels jointly.

9. A unit according to claim 6, characterized in that the first coefficient computer computes direct coefficients of the second channel, the second coefficient computer computes inverse coefficients of the first and second channels jointly, and the predistorter predistorts the signal to be sent by means of the coefficients of the convolution of the direct coefficients of the second channel and of the inverse coefficients of the first and second channels jointly.

10. A unit of a telecommunications system that predistorts a signal to be sent to a second unit, said unit comprising a predistorter which predistorts said signal to be sent; characterized in that said unit further comprises

- a first inverse coefficient computer which computes inverse coefficients of the second channel on the basis of a second sequence sent from the second unit to the first unit;
- a first sequence transmitter which sends to the second unit a first sequence which results from the convolution of a predetermined sequence and of said inverse coefficients of the second channel, said first sequence being sent back as received by the second unit to the first unit, in the form of a return sequence;
- a second inverse coefficient computer which computes inverse coefficients of the first channel on the basis of said return sequence; and
- wherein said predistorter predistorts the signal to be sent according to said inverse coefficients of the first channel.

11. A remote unit for sending back to the unit according to claim 10, in the form as received, said first sequence in the form of a return sequence, characterized in that the remote unit comprises:

- a connector which connects, in a way that is synchronized with the arrival of the first sequence, an output of a down-converter with an input of an up-converter.

* * * * *